(12) United States Patent
Brundage et al.

(10) Patent No.: US 7,760,906 B2
(45) Date of Patent: *Jul. 20, 2010

(54) STEGANOGRAPHIC ENCODING

(75) Inventors: Trent J. Brundage, Tigard, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 126 days.

This patent is subject to a terminal disclaimer.

(21) Appl. No.: 12/177,743

(22) Filed: Jul. 22, 2008

(65) Prior Publication Data
US 2009/0180665 A1 Jul. 16, 2009

Related U.S. Application Data

(63) Continuation of application No. 11/621,459, filed on Jan. 9, 2007, now Pat. No. 7,403,633, which is a continuation of application No. 10/359,550, filed on Feb. 5, 2003, now Pat. No. 7,162,052, which is a continuation-in-part of application No. 10/286,357, filed on Oct. 31, 2002, now Pat. No. 7,065,228, and a continuation-in-part of application No. 10/165,751, filed on Jun. 6, 2002, now Pat. No. 6,754,377, which is a continuation of application No. 09/074,034, filed on May 6, 1998, now Pat. No. 6,449,377.

(60) Provisional application No. 60/082,228, filed on Apr. 16, 1998.

(51) Int. Cl.
*G06K 9/00* (2006.01)
*G07F 7/00* (2006.01)

(52) U.S. Cl. .................. 382/100; 382/135; 194/206

(58) Field of Classification Search ............... 382/100, 382/232, 240; 380/51, 54, 210, 252, 287; 370/522–529; 283/72, 74–81, 85, 93, 113, 283/901, 902; 713/176, 179; 348/461, 463; 358/3.28, 502; 194/205, 206
See application file for complete search history.

(56) References Cited

U.S. PATENT DOCUMENTS

| | | | |
|---|---|---|---|
| 4,423,415 | A | 12/1983 | Goldman |
| 5,161,829 | A | 11/1992 | Detrick et al. |

(Continued)

FOREIGN PATENT DOCUMENTS

EP 1143723 10/2001

(Continued)

OTHER PUBLICATIONS

Printout of http://www.geimd.com/detail/process1.html on Oct. 30, 2002 (1 page).

(Continued)

*Primary Examiner*—Abolfazl Tabatabai

(57) ABSTRACT

The present invention relates generally to steganographic encoding. Once claim recites a method including: obtaining plural-bit auxiliary data; creating an original carrier signal representing the plural-bit auxiliary data; reducing information content of the original carrier signal so that the carrier still conveys the plural-bit auxiliary data, yielding a reduced carrier signal; and hiding the reduced carrier signal in host data. Another claim recites a mechanical part including: a metallic surface including a pattern, the pattern conveying plural-bit auxiliary data in a steganographic manner, and the pattern provides at least diffuse reflection. Of course, other claims and combinations are also provided.

26 Claims, 6 Drawing Sheets

U.S. PATENT DOCUMENTS

| | | | |
|---|---|---|---|
| 5,325,167 A | 6/1994 | Melen | |
| 5,329,108 A | 7/1994 | Lamoure | |
| 5,369,419 A | 11/1994 | Stephenson et al. | |
| 5,396,559 A | 3/1995 | McGrew | |
| 5,411,296 A | 5/1995 | Mallik | |
| 5,695,220 A | 12/1997 | Phillips | |
| 5,786,587 A | 7/1998 | Colgate, Jr. | |
| 5,808,758 A * | 9/1998 | Solmsdorf | 359/2 |
| 5,822,436 A | 10/1998 | Rhoads | |
| 5,830,609 A | 11/1998 | Warner | |
| 5,850,481 A * | 12/1998 | Rhoads | 382/232 |
| 5,862,260 A * | 1/1999 | Rhoads | 382/232 |
| 5,915,027 A * | 6/1999 | Cox et al. | 380/54 |
| 5,960,081 A * | 9/1999 | Vynne et al. | 713/176 |
| 6,031,914 A * | 2/2000 | Tewfik et al. | 380/54 |
| 6,061,121 A | 5/2000 | Holl et al. | |
| 6,117,384 A | 9/2000 | Laurin et al. | |
| 6,122,403 A | 9/2000 | Rhoads | |
| 6,286,761 B1 | 9/2001 | Wen | |
| 6,311,214 B1 | 10/2001 | Rhoads | |
| 6,449,377 B1 * | 9/2002 | Rhoads | 382/100 |
| 6,458,913 B1 | 10/2002 | Honigfort et al. | |
| 6,465,102 B1 | 10/2002 | Honigfort et al. | |
| 6,505,779 B1 | 1/2003 | Power | |
| 6,585,341 B1 | 7/2003 | Walker | |
| 6,614,914 B1 | 9/2003 | Rhoads et al. | |
| 6,724,912 B1 * | 4/2004 | Carr et al. | 382/100 |
| 6,754,377 B2 | 6/2004 | Rhoads | |
| 6,803,088 B2 | 10/2004 | Kaminsky et al. | |
| 6,882,737 B2 | 4/2005 | Lofgren et al. | |
| 6,912,295 B2 | 6/2005 | Reed et al. | |
| 6,915,020 B2 | 7/2005 | Damera-Venkata et al. | |
| 6,947,571 B1 | 9/2005 | Rhoads et al. | |
| 6,993,152 B2 | 1/2006 | Patterson et al. | |
| 7,063,264 B2 | 6/2006 | Bi et al. | |
| 7,063,924 B2 | 6/2006 | Kaminsky et al. | |
| 7,065,228 B2 | 6/2006 | Brundage | |
| 7,080,041 B2 | 7/2006 | Nagel | |
| 7,089,420 B1 | 8/2006 | Durst et al. | |
| 7,127,615 B2 | 10/2006 | Moskowitz | |
| 7,130,461 B2 | 10/2006 | Rosenholtz | |
| 7,162,052 B2 | 1/2007 | Brundage et al. | |
| 7,190,496 B2 | 3/2007 | Klug et al. | |
| 7,271,398 B2 | 9/2007 | Androsyuk et al. | |
| 7,321,667 B2 | 1/2008 | Stach | |
| 7,403,633 B2 | 7/2008 | Brundage et al. | |
| 7,532,741 B2 | 5/2009 | Stach | |
| 2001/0001854 A1 | 5/2001 | Schena et al. | |
| 2001/0037455 A1 | 11/2001 | Lawandy et al. | |
| 2001/0055258 A1 | 12/2001 | Carson et al. | |
| 2002/0023218 A1 | 2/2002 | Lawandy et al. | |
| 2002/0054356 A1 | 5/2002 | Kurita et al. | |
| 2002/0081413 A1 | 6/2002 | DallaVerde | |
| 2003/0061500 A1 | 3/2003 | Mimura et al. | |
| 2003/0118208 A1 | 6/2003 | Epstein | |
| 2004/0086151 A1 | 5/2004 | Brundage et al. | |

FOREIGN PATENT DOCUMENTS

| | | |
|---|---|---|
| EP | 1147495 | 2/2003 |
| WO | WO98/33658 | 8/1998 |
| WO | WO02/27617 | 4/2002 |
| WO | WO03/005291 | 1/2003 |
| WO | WO03/030105 | 4/2003 |

OTHER PUBLICATIONS

Printout of http://www.geimd.com/detail/material1.html on Oct. 30, 2002 (1 page).

Printout of http://www.geimd.com/detail/process_screen_printing.html on Oct. 30, 2002 (2 pages).

Printout of http://www.geimd.com/detail/process_film_forming.html on Oct. 30, 2002 (3 pages).

Printout of http://www.geimd.com/detail/process_trimming.html on Oct. 30, 2002 (3 pages).

Printout of http://www.geimd.com/detail/process_im.html on Oct. 30, 2002 (1 page).

Stepien et al., "Distributed Kinoforms in Optical Security Applications", SPIE, Optical Engineering, vol. 35, No. 9, Sep. 1996, pp. 2453-2458.

Stepien, "Computer Generated Holograms and Diffraction Gratings in Optical Security Applications", Proc. Of SPIE vol. 3973, 2000, pp. 224-230.

Stepien et al., "Pure-Phase Iteratively Generated Fourier Hologram as a Security Mark", SPIE vol. 2659, 1996, pp. 223-228.

Dittmann et al., "Hologram Watermarks for Document Authentications", IEEE 2001, pp. 60-64.

Aoki, "Watermarking Technique Using Computer-Generated Holograms", Electronics and Communication in Japan, Part 3, vol. 84, No. 1, 2001, pp. 21-31.

Aug. 28, 2007 Notice of Allowance; Aug. 7, 2007 Supplemental Amendment; Aug. 3, 2007 Examiner's Interview Summary; Jul. 23, 2007 Amendment; Jul. 18, 2007 non-final Office Action; all from assignee's U.S. Appl. No. 11/127,442 (issued as U.S. Patent No. 7,321,667).

Dec. 30, 2008 Notice of Allowance; Nov. 14, 2008 Amendment; and Oct. 8, 2008 non-final Office Action; all from assignee's U.S. Appl. No. 12/017,636 (issued as U.S. Patent No. 7,532,741).

* cited by examiner

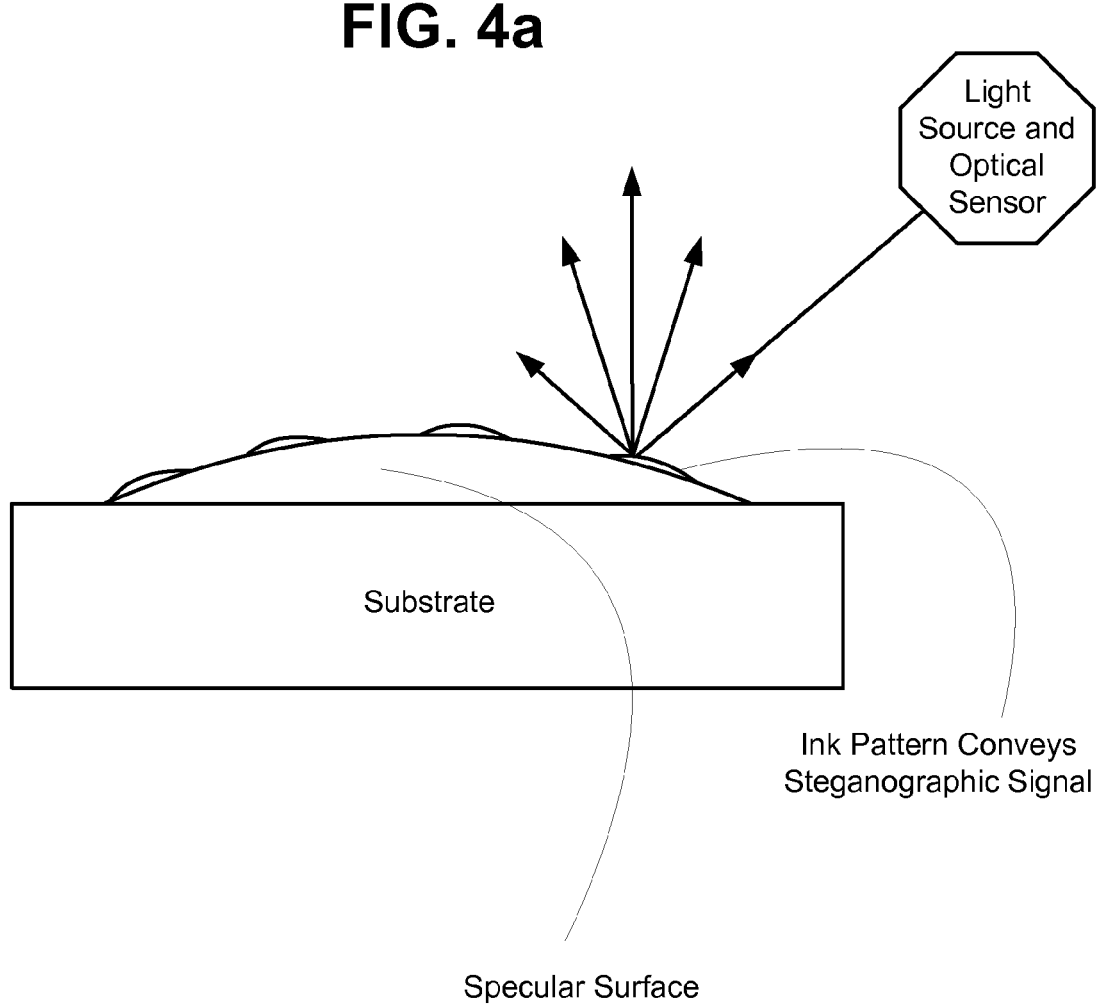

STEGANOGRAPHIC ENCODING

RELATED APPLICATION DATA

This application is a continuation of U.S. patent application Ser. No. 11/621,459, filed Jan. 9, 2007 (now U.S. Pat. No. 7,403,633) which is a continuation of U.S. patent application Ser. No. 10/359,550, filed Feb. 5, 2003 (now U.S. Pat. No. 7,162,052), which is a continuation-in-part of U.S. patent application Ser. No. 10/286,357, filed Oct. 31, 2002 (now U.S. Pat. No. 7,065,228). The 10/359,550 application is also a continuation of U.S. patent application Ser. No. 10/165,751, filed Jun. 6, 2002 (now U.S. Pat. No. 6,754,377), which is a continuation of U.S. patent application Ser. No. 09/074,034, filed May 6, 1998 (now U.S. Pat. No. 6,449,377). The Ser. No. 09/074,034 application claims the benefit of U.S. Provisional Patent Application No. 60/082,228, filed Apr. 16, 1998. Each of these U.S. Patent documents is herein incorporated by reference.

FIELD OF THE INVENTION

The present invention relates to methods and systems for steganographically arranging data on specular surfaces (e.g., mirror-like surfaces) and associated methods/systems for decoding steganographically-arranged data from such surfaces.

BACKGROUND AND SUMMARY OF THE INVENTION

Counterfeiting and forgeries continue to proliferate. A hot area of counterfeiting is consumer products, such as cellular phones, logos and cameras. Often cellular phones include interchangeable faceplates. (Or a camera includes a logo plate, which is easily replicated by thieves.). A common counterfeiting scenario involves counterfeiting the faceplate, and then passing off the counterfeit faceplate as genuine.

One solution is to provide steganographic auxiliary data in or on consumer products to help prevent or detect counterfeiting. The data can be decoded to determine whether the object is authentic. The auxiliary data may also provide a link to a network resource, such as a web site or data repository. The absence of expected auxiliary data may also provide a clue regarding counterfeiting.

One form of steganography includes digital watermarking. Digital watermarking systems typically have two primary components: an encoder that embeds the watermark in a host media signal, and a decoder (or reader) that detects and reads the embedded watermark from a signal suspected of containing a watermark. The encoder can embed a watermark by altering the host media signal. The decoding component analyzes a suspect signal to detect whether a watermark is present. In applications where the watermark encodes information, the decoder extracts this information from the detected watermark. Data can be communicated to a decoder, e.g., from an optical sensor.

One challenge to the developers of watermark embedding and reading systems is to ensure that the watermark is detectable even if the watermarked media content is transformed in some fashion. The watermark may be corrupted intentionally, so as to bypass its copy protection or anti-counterfeiting functions, or unintentionally through various transformations (e.g., scaling, rotation, translation, etc.) that result from routine manipulation of the content. In the case of watermarked images, such manipulation of the image may distort the watermark pattern embedded in the image.

A watermark can have multiple components, each having different attributes. To name a few, these attributes include function, signal intensity, transform domain of watermark definition (e.g., temporal, spatial, frequency, etc.), location or orientation in host signal, redundancy, level of security (e.g., encrypted or scrambled), etc. The components of the watermark may perform the same or different functions. For example, one component may carry a message, while another component may serve to identify the location or orientation of the watermark. Moreover, different messages may be encoded in different temporal or spatial portions of the host signal, such as different locations in an image or different time frames of audio or video. In some cases, the components are provided through separate watermarks.

There are a variety of alternative embodiments of an embedder and detector. One embodiment of an embedder performs error correction coding of a binary message, and then combines the binary message with a carrier signal to create a component of a watermark signal. It then combines the watermark signal with a host signal. To facilitate detection, it may also add a detection component to form a composite watermark signal having a message and detection component. The message component includes known or signature bits to facilitate detection, and thus, serves a dual function of identifying the mark and conveying a message. The detection component is designed to identify the orientation of the watermark in the combined signal, but may carry an information signal as well. For example, the signal values at selected locations in the detection component can be altered to encode a message.

One embodiment of a detector estimates an initial orientation of a watermark signal in a host signal, and refines the initial orientation to compute a refined orientation. As part of the process of refining the orientation, this detector may compute at least one orientation parameter that increases correlation between the watermark signal and the host signal when the watermark or host signal is adjusted with the refined orientation.

Another detector embodiment computes orientation parameter candidates of a watermark signal in different portions of a signal suspected of including a digital watermark, and compares the similarity of orientation parameter candidates from the different portions. Based on this comparison, it determines which candidates are more likely to correspond to a valid watermark signal.

Yet another detector embodiment estimates orientation of the watermark in a signal suspected of having a watermark. The detector then uses the orientation to extract a measure of the watermark in the suspected signal. It uses the measure of the watermark to assess merits of the estimated orientation. In one implementation, the measure of the watermark is the extent to which message bits read from the target signal match with expected bits. Another measure is the extent to which values of the target signal are consistent with the watermark signal. The measure of the watermark signal provides information about the merits of a given orientation that can be used to find a better estimate of the orientation. Of course other watermark embedder and detectors can be suitably interchanged with some embedding/detecting aspects of the present invention.

Some techniques for embedding and detecting watermarks in media signals are detailed in the assignee's co-pending U.S. patent application Ser. No. 09/503,881, U.S. Pat. No. 6,122,403 and PCT patent application PCT/U.S. Pat. No. 02/20832 (published as WO 03/005291), which are each herein incorporated by reference. The artisan is assumed to be familiar with the foregoing prior art.

In the following disclosure it should be understood that references to watermarking and steganographic hiding encompass not only the assignee's technology, but can likewise be practiced with other technologies as well.

Recent developments of highly reflective films and surfaces have required consideration of how best to steganographically mark these types of surfaces. One such surface is a so-called specular surface. A specular surface often reflects light away from the light's source. This can create signal detection problems since relevant optical scan data may be reflected away from a co-located optical sensor.

Accordingly, one aspect of the present invention provides a method of steganographically marking a specular surface. The method includes steps to provide a steganographic signal including at least plural-bit data, and to arrange ink in a pattern on the specular surface to represent the steganographic signal. The ink, once arranged on the specular surface, provides a surface including at least a diffuse reflection property.

Another aspect of the present invention provides a method of marking a specular surface. The method includes the steps of: providing an image including generally uniform pixel values; embedding a digital watermark signal in the image, which effects a change to at least some of the generally uniform pixel values; thresholding the digitally watermarked image; and printing the thresholded, digitally watermarked image on the specular surface with an ink or dye that, once printed, provides an ink or dye surface comprising at least a diffuse reflection property.

Yet another aspect of the present invention is a three-dimensional molded article. The article includes a decorative film or substrate and an adjacent molded polymeric base. The decorative film or substrate includes a specular surface. An improvement to the article is a steganographic signal applied to the decorative film or substrate through arranging an ink pattern on the specular surface. A coloration of the ink is selected to conceal the ink pattern on the specular surface.

Still another aspect of the present invention is a method of steganographically marking a mirror-like surface. The mirror-like surface includes a first coloration and a first finish. The method includes the steps of providing a steganographic signal including at least plural-bit data, and arranging ink in a pattern on the mirror-like surface to represent the steganographic signal. The ink forms a surface which provides Lambertian reflection. At least one of an ink coloration and ink finish is selected to hide the ink with respect to at least one of the first coloration and the first finish.

Yet another aspect of the present invention is a laminate comprising a multi-layered structure including a film having a specular surface. The film is sandwiched between a polymeric substrate and an over-laminate. An improvement to the laminate is ink adjacently arranged to the specular surface so as to convey a steganographic signal. The ink provides an ink surface with a diffuse reflection property.

The foregoing and other features and advantages of the present invention will be even more readily apparent from the following detailed description, which proceeds with reference to the accompanying drawings. Of course, the drawings are not necessarily presented to scale, but rather focus on inventive aspects of the invention.

BRIEF DESCRIPTION OF THE DRAWINGS

FIG. 1 corresponds to FIG. 5 in parent U.S. Pat. No. 6,449,377.

FIG. 4a illustrates a reflectance example for a preferred ink or dye that conveys a steganographic signal.

DETAILED DESCRIPTION

Figure 1:
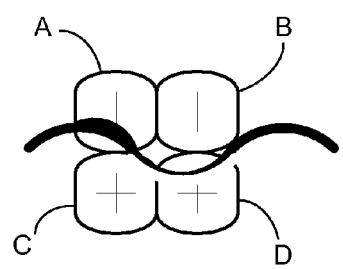
FIG. 1 illustrates changes to the width of a line to effect watermark encoding.

In parent U.S. Pat. No. 6,449,377 we teach:

In a first embodiment of the invention, shown in FIG. [1], the width of the line is controllably varied so as to change the luminosity of the regions through which it passes. To increase the luminosity (or reflectance), the line is made narrower (i.e. less ink in the region). To decrease the luminosity, the line is made wider (i.e. more ink).

Whether the luminance in a given region should be increased or decreased depends on the particular watermarking algorithm used. Any algorithm can be used, by changing the luminosity of regions 12 as the algorithm would otherwise change the luminance or colors of pixels in a pixelated image.

In an exemplary algorithm, the binary data is represented as a sequence of −1s and 1s, instead of 0s and 1s. (The binary data can comprise a single datum, but more typically comprises several. In an illustrative embodiment, the data comprises 100 bits.)

Each element of the binary data sequence is then multiplied by a corresponding element of a pseudo-random number sequence, comprised of −1s and 1s, to yield an intermediate data signal. Each element of this intermediate data signal is mapped to a corresponding sub-part of the image, such as a region 12. The image in (and optionally around) this region is analyzed to determine its relative capability to conceal embedded data, and a corresponding scale factor is produced. Exemplary scale factors may range from 0 to 3. The scale factor for the region is then multiplied by the element of the intermediate data signal mapped to the region in order to yield a "tweak" value for the region. In the illustrated case, the resulting tweaks can range from −3 to 3. The luminosity of the region is then adjusted in accordance with the tweak value. A tweak value of −3 may correspond to a −5% change in luminosity; −2 may correspond to −2% change; −1 may correspond to −1% change; 0 may correspond to no change; 1 may correspond to +1% change; 2 may correspond to +2% change, and 3 may correspond to +5% change. (This example follows the basic techniques described in the Real Time Encoder embodiment disclosed in patent U.S. Pat. No. 5,710,834.)

In FIG. [1], the watermarking algorithm determined that the luminance of region A should be reduced by a certain percentage, while the luminance of regions C and D should be increased by certain percentages.

In region A, the luminance is reduced by increasing the line width. In region D, the luminance is increased by reducing the line width; similarly in region C (but to a lesser extent).

No line passes through region B, so there is no opportunity to change the region's luminance. This is not fatal to the method, however, since the watermarking algorithm redundantly encodes each bit of data in sub-parts spaced throughout the line art image.

The changes to line widths in regions A and D of FIG. [1] are exaggerated for purposes of illustration. While the illustrated variance is possible, most implementations will modulate the line width 3-50% (increase or decrease).

. . .

In still a further embodiment, the luminance in each region is changed while leaving the line unchanged. This can be effected by sprinkling tiny dots of ink in the otherwise-vacant parts of the region. In high quality printing, of the type used with banknotes, droplets on the order of 3 μm in diameter can be deposited. (Still larger droplets are still beyond the perception threshold for most viewers.) Speckling a region with such droplets (either in a regular array, or random, or according to a desired profile such as Gaussian), can readily effect a 1% or so change in luminosity. (Usually dark droplets are added to a region, effecting a decrease in luminosity. Increases in luminosity can be effected by speckling with a light colored ink, or by forming light voids in line art otherwise present in a region.)

In a variant of the speckling technique, very thin mesh lines can be inserted in the artwork—again to slightly change the luminance of one or more regions.

Figure 2:
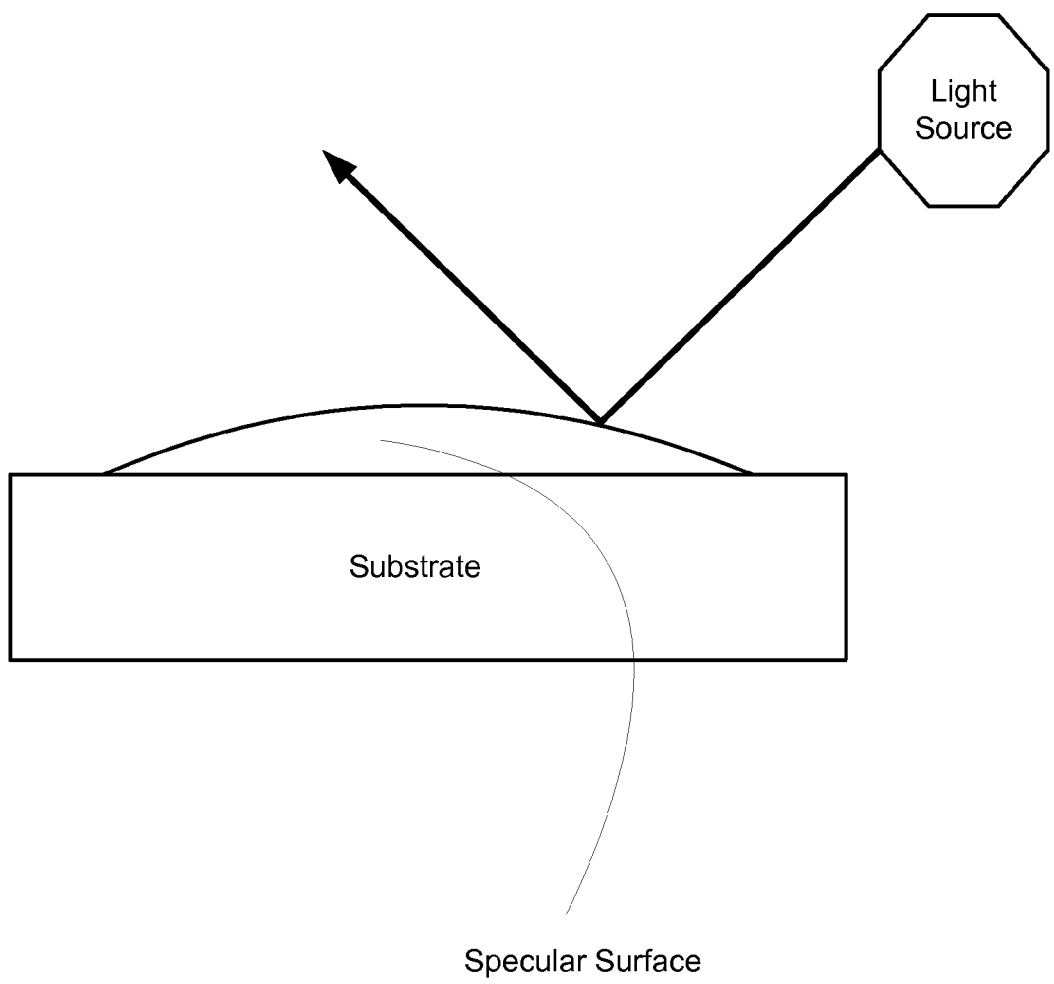
FIG. 2 illustrates a reflectance example for a specular surface.

We have found that we can apply analogous and/or improved techniques to steganographically encode specular reflective surfaces. With reference to FIG. 2, a specular surface generally reflects light away from (and not generally back to) the light's source. In one implementation, a specular surface reflects light in a directional manner such that the angle of reflection is equal to the angle of incidence. While the specular surface of FIG. 2 is illustrated as being adjacently arranged with a substrate, the present invention is not so limited.

Specular surfaces can be devoid of text or images, and often include a metallic-like surface luster (or finish). Examples of specular reflective materials include some of 3M's Radiant Light Films™ (e.g., 3M's Radiant Mirror and Visible Mirror products). The Radiant Light Films™ can be combined with a Lexan® sheet (from GE Corporation) and an over-laminate (e.g., a polycarbonate, polyvinyl fluoride, polyester, etc.). Dorrie Corporation in the United States provides a variety of suitable laminates. Of course, a specular surface can include coloration and textures (e.g., tints, patterns, sparkles, etc.). Some of these specular surfaces even change color hue at different viewing angles and thinning ratios across the specular surface (e.g., 3M's Color Mirror Film).

Steganographically encoding specular surfaces has heretofore presented unique challenges. A first challenge is that with such a reflective surface, information is difficult to hide without being aesthetically displeasing. A second challenge is signal detection. Some steganographic readers include or cooperate with a light source (e.g., LED or illumination source) to facilitate better detection. These steganographic readers often position or co-locate an optical sensor at or near the light source. Yet, with a specular surface, light reflects away from the light source (and optical sensor), yielding little or no optical data for capture by the optical sensor. An optical sensor would need to be placed along the angle of reflection to capture relevant optical data. This configuration is awkward and practically impossible for a steganographic reader. Accordingly, it is very difficult to capture and read a signal on a specular surface.

Figure 3:
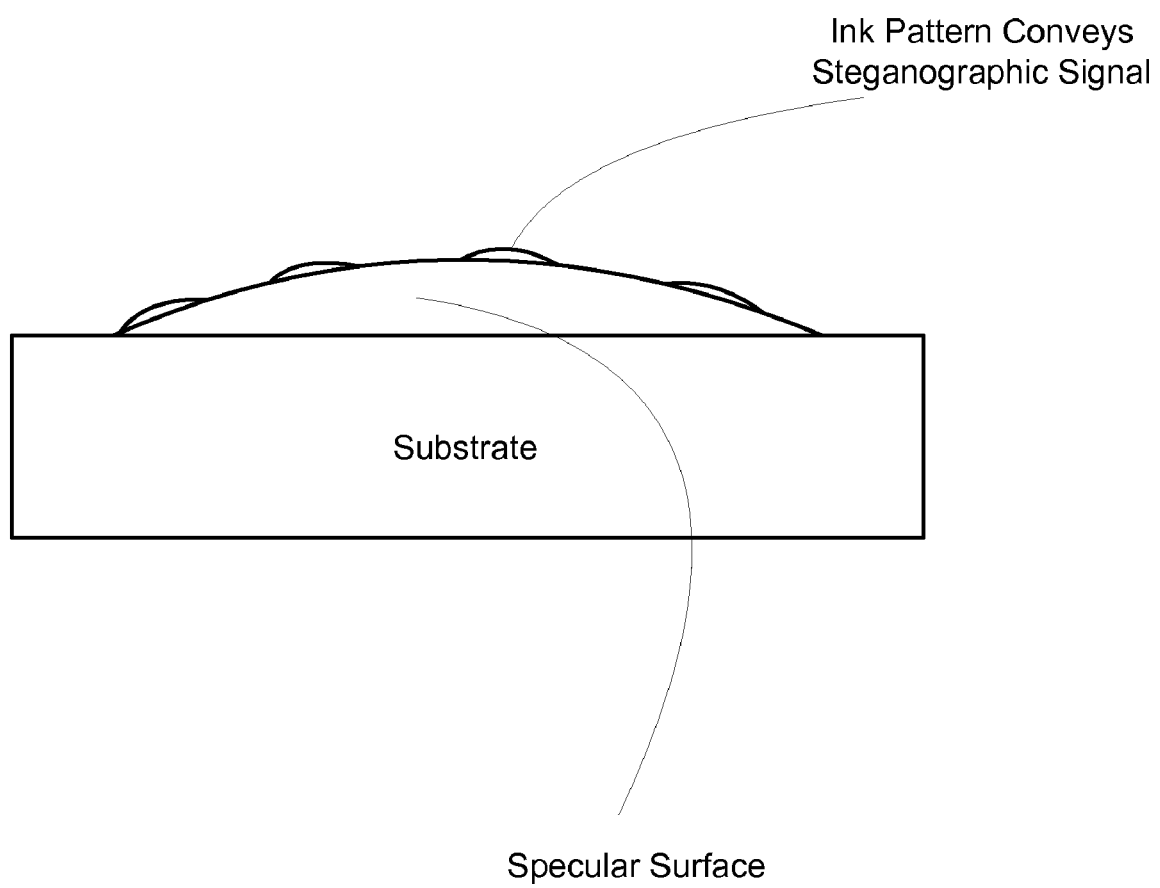
FIG. 3 illustrates the specular surface of FIG. 2 including a steganographic signal conveyed through arrangement of ink or dye.

With reference to FIG. 3, we overcome these challenges by sprinkling (or providing, over-printing, etc.) ink and/or dye on the specular surface. The ink or dye is provided on the specular surface so as to convey a steganographic signal.

The ink or dye is preferably selected or applied to blend in, hide or otherwise avoid contrast with the specular surface. For example, if the specular surface includes a chrome, gold or silver coloration, the ink or dye preferably includes at least a complimentary chrome, gold or silver coloration. Or if the specular surface includes a pattern or background, the ink or dye can be selected to match or otherwise blend in with the pattern or background. In other cases the ink or dye is generally opaque or transparent. Yet the transparent ink still preferably includes favorable reflective properties. Still further, the ink can be selected to include a somewhat glossy finish so as to even further improve the ink's hiding characteristics. In other implementations the ink includes a dull or even matt-like finish. A dull or matt-like finish may provide preferred reflection properties (e.g., approximating Lambertian reflection) as discussed below.

The ink or dye preferably comprises a diffuse reflection surface or property. A diffuse reflection surface is one that generally diffuses a light ray in multiple directions, including, e.g., back toward the source of the light ray (see FIG. 4a). This characteristic allows for steganographic signal capture by an optical sensor positioned at or near a light source. For example, the optical sensor captures optical scan data that includes a representation of the steganographic signal. The captured scan data is communicated to a decoder to decipher the steganographic signal. (In some implementations the ink approximates Lambertian reflection, which implies that the ink reflects light in multiple directions, and hence can be perceived (or optically captured) from the multiple directions. With Lambertian reflection, the brightness of a reflected ray depends on an angle between a direction of the light source and the surface normal.). We note, with reference to FIG. 4b, that the optical sensor need not be positioned at the light source, but instead can be positioned to receive another (or additional) reflected light ray(s). One FIG. 4b implementation packages the optical sensor and light source in a signal apparatus (e.g., a hand-held steganographic signal detector).

The steganographic signal preferably conveys a message or payload. In some implementations the message or payload includes a unique identifier for identifying the object or surface. Or the message or payload may provide authentication clues. In other implementations the message or payload provides auxiliary information, e.g., pertaining to an associated object or manufacturing details, distribution history, etc. In still other implementations the message or payload includes a link or index to a data repository. The data repository includes the identifier, authentication clues, and/or auxiliary information. (See assignee's U.S. patent application Ser. No. 09/571, 422, herein incorporated by reference, for some related linking techniques. The disclosed techniques are suitably interchangeable with the linking aspect of the present invention.).

The steganographic signal may be optionally fragile, e.g., the signal is destroyed (or irreproducible) or predictably degrades upon signal processing such as scanning and printing.

The steganographic signal may include an orientation component which is useful in helping to resolve image distortion such as rotation, scaling, and translation, etc., and/or to help detect the message or payload. The orientation component may be a separate signal, or may be combined (or concatenated) with the message or payload.

The steganographic signal may also be redundantly provided across a specular surface so as to redundantly convey the orientation, message or payload (or plural-bit data). Or the signal may be object or location specific. For example, if the specular surface includes a graphic or background pattern/texture/tint, the signal can be limited to over the graphic or background pattern/texture/tint.

In one implementation, the ink pattern is arranged according to a so-called digital watermark signal. The signal can be a "pure" or "raw" signal. A pure or raw digital watermark signal is generally one that conveys information without influence or consideration of a host image or text. In some implementations the pattern appears as (or includes) a background texture or tint. In other implementations the pattern appears as if a random (or pseudo-random) pattern.

Figure 5A:
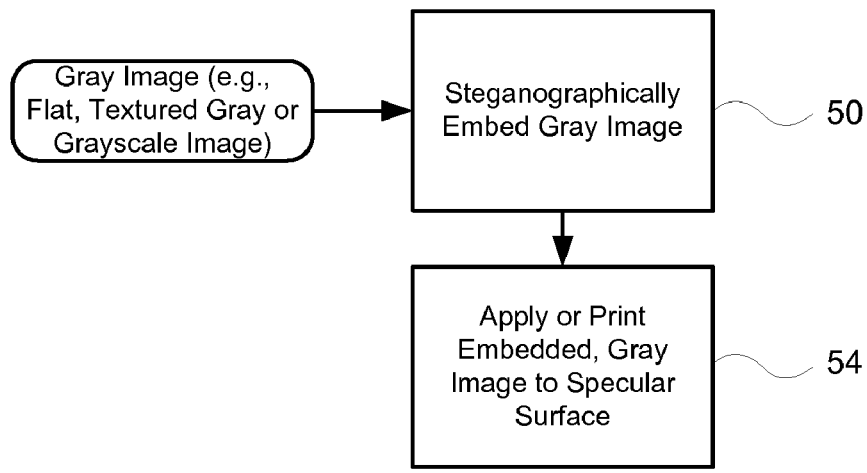
FIG. 5a illustrates a flow diagram for a signal hiding method according to one aspect of the present invention.

In one digital watermarking implementation, and with reference to FIG. 5a, we start with a gray or monotone image (e.g., a flat gray image including substantially uniform pixel values or subtly varying grayscale texture, tint or pattern). We can use standard image editing software such as Adobe's Photoshop or Jasc Software's PaintShop Pro, etc., etc. to provide the gray image. The gray image serves as a "host" image and is passed to a digital watermark-embedding module (step 50). The digital watermarking module can encode the gray image, e.g., based on a transform domain watermark embedding technique or spatial domain watermark embedding technique, etc. The resulting embedded, gray image is then printed or otherwise applied to the specular surface (step 54). (In some implementations, a specular surface is provided as a thin film, which can be readily feed through an offset printing press or laser/ink jet printer.).

Figure 5B:
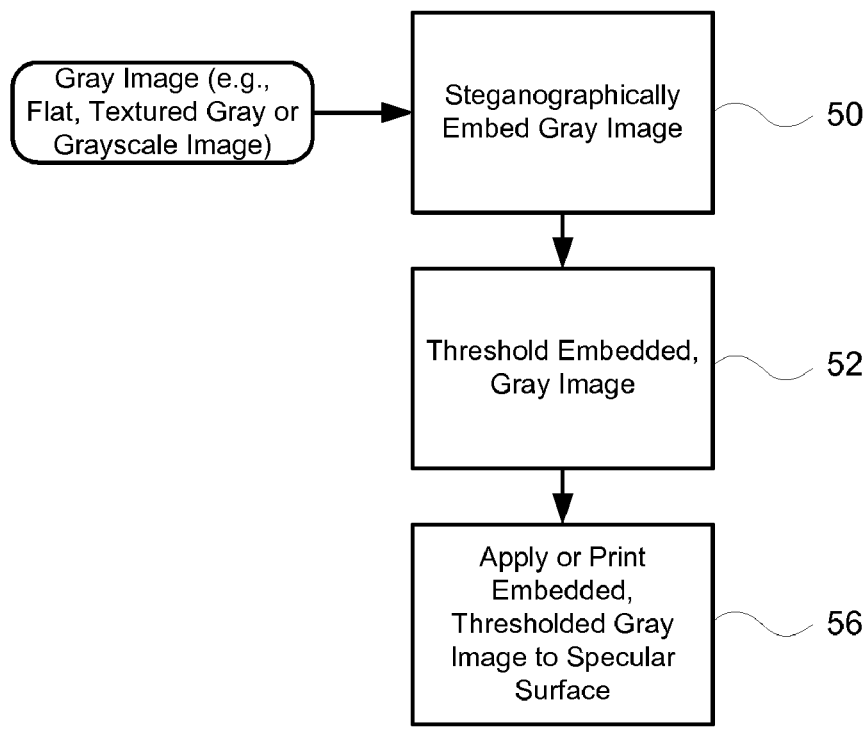
FIG. 5b illustrates a flow diagram for the FIG. 5a method including a thresholding step.

In another implementation, we "threshold" the embedded gray image prior to printing or applying to the specular surface (step 52 in FIG. 5b). Generally, thresholding reduces the watermark signal and/or watermarked image. In one implementation, a watermark signal is embedded as a plurality of peaks and valleys (or plus and minus signal tweaks). The tweaks can be encoded in a gray image by changing or effecting pixel values, e.g., changing gray-scale levels for pixels. (We note that transform domain embedding also effects pixels values.). Thresholding this embedded gray image may then include selecting a grayscale level (e.g., level 128 in an 8-bit (or 256 level) grayscale image) and discarding all pixels with a grayscale level below (or above) level 128. Of course, there are many other thresholding techniques that can be employed, such as filtering the embedded gray image, creating a binary image (e.g., toggling image pixels to be on or off based on pixel values of the embedded gray image), discarding pixels based on coefficient values (or blocks of coefficient values), etc., etc. The thresholded, embedded gray image is then applied or printed to the specular surface (56).

In some implementations two or more digital watermarks are provided in the steganographic signal. The two or more watermarks can cooperate for authentication. For example, each of the two watermarks may include overlapping payload information that can be compared to determine authenticity. Or a first digital watermark may be fragile, while a second digital watermark is robust. Still further, a first digital watermark may include an orientation component, while the second digital watermark includes a message or payload. Or a first digital watermark may include a key to decrypt or otherwise assist in decoding a second digital watermark.

If using a sheet of specular material (e.g., 3M's Radiant Light Films), ink can be printed (e.g., screen-printed, dye-diffusion thermal transfer (D2T2), and ink or laser jet printing, etc.) directly onto the sheet. A tie coat can be laid down on the film, prior to printing, to help the ink better adhere to the film's surface.

The printed sheet can then be applied to an object such as a consumer device, electronics device, label, sticker, identification documents (e.g., driver's licenses, passports, identification cards, badges, access cards, etc.) certificate, automobile (e.g., as a paint substitute or as an overlay, etc.), credit cards, personal digital assistants (PDAs), molded logos (e.g., for attachment to articles such as shoes and clothing, equipment or consumer products), handheld and console video games, pagers, dashboards, stereo faceplates or covers, plastic articles, etc. The printed sheet can also be used as or in conjunction with a holographic structure or optical variable device. In some cases we even use the specular surface as a hologram-like structure or component.

In one embodiment, the printed sheet is provided to a molding process, e.g., as contemplated in our parent U.S. patent application Ser. No. 10/286,357. In some implementations of this embodiment, the printed sheet is combined with (e.g., adhered to) a carrier sheet such as a Lexan® polycarbonate sheet (Lexan® is provided by GE Plastics in the United States). A layered printed specular sheet/Lexan® sheet structure is also hereafter referred to as a "printed sheet." The printed sheet is provided to an injection mold, perhaps after pre-forming or pre-molded the printed sheet. The printed sheet is preferably positioned in the mold so as to have the bottom surface of the printed sheet adjacent to a second material, e.g., injected polycarbonate or polymeric resin (or other suitable injection materials). A three-dimensional object results including a printed specular sheet/Lexan®/injection material structure. (We note that the various layer materials will sometimes fuse or migrate into other layers during an injection molding process.) We can also provide an over-laminate (e.g., polycarbonate, polyester, polyurethane, etc.) over the printed specular surface. The printed steganographic signal can be reversed if applied to a bottom layer of the printed sheet when the signal will be viewed from a top-surface of the printed sheet. Reversing the printing will typically allow for an easier read when the signal is scanned from a top layer of the printed sheet.

In another molding implementation, we provide the printed specular sheet to be sandwiched in between a sheet of Lexan® and injection molding material. The Lexan® is preferably somewhat transparent to allow viewing of the printed specular surface through the Lexan®.

In a related embodiment, we provide a substrate (e.g., a Lexan® sheet) and a specular surface (e.g., a Radiant Light Film®) adjacently arranged on or adhered to the substrate (collectively referred to as a "structure"). The specular surface is printed to include a steganographic signal as discussed herein. The structure can optionally include a laminate layer. The structure is then used as a laminate or covering. The laminate or covering is applied (e.g., with an adhesive or via a molding process) to various objects (cell phones, automotive parts, labels, identification documents, plastic parts, computer equipment, etc.).

Figure 6:
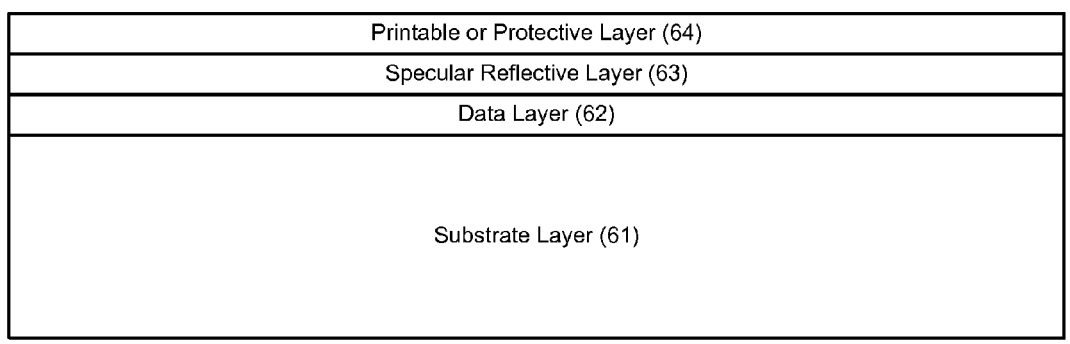
FIG. 6 illustrates a cross-sectional view of a multi-layered disc according to one embodiment of the present invention.

Another embodiment involves the application of our techniques to compact discs (e.g., CDs, CD-Rs and CD-RWs) and digital video discs (e.g., DVDs, DVD-Rs and DVD-RWs). An example is given with respect to CD-Rs, but our techniques apply to other CDs and DVDs as well. With reference to FIG. 6, a CD-R generally includes a multi-layered structure including a plastic (e.g., polycarbonate) substrate (61), a translucent data layer of recordable material such as an organic dye (62)

and a specular reflective layer (63). Some CD-Rs also have an additional protective or printable coating (64) adjacent to the specular reflective layer (63).

When making CD-R media, instead of pits and lands, a spiral is pressed or formed into the substrate, e.g., by injection molding from a stamper, as a guide to a recording laser. The recording laser selectively melts the translucent data layer of CD-R discs during the recording process. The positions where the data layer is melted becomes opaque or refractive, scattering a reading laser beam so it is not reflected back (or is reflected as a different intensity) into a reader's sensors. The reader interprets a difference between reflected and non-reflected light as a binary signal.

We can apply our steganographic signal on a top or bottom side of the specular reflective layer 63 (or other adjacently arranged layers) as discussed above. We preferably threshold the steganographic signal (or embedded grayscale image) prior to application to the specular reflective layer 63. A high threshold will help prevent reading errors due to the printed ink.

In one implementation of this embodiment, the steganographic signal includes a decoding key. The decoding key is used to decode (or decrypt) the data (e.g., audio, video, data) on the disc. In another implementation, the steganographic signal includes an identifier which is used to determine whether the disc is authentic. Illegal copies will not include the steganographic watermark on the specular surface—evidencing an unauthorized copy.

Concluding Remarks

To provide a comprehensive disclosure without unduly lengthening this specification, each of the above-identified patent documents is herein incorporated by reference.

Having described and illustrated the principles of the invention with reference to illustrative embodiments, it should be recognized that the invention is not so limited. The present invention finds application beyond such illustrative embodiments.

For example, the technology and solutions disclosed herein have made use of elements and techniques known from the cited documents. Other elements and techniques can similarly be combined to yield further implementations within the scope of the present invention. Thus, for example, single-bit watermarking can be substituted for multi-bit watermarking, technology described as using steganographic watermarks or encoding can alternatively be practiced using visible marks (glyphs, etc.) or other encoding, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption. Etc., etc., etc. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art.

Figure 4B:
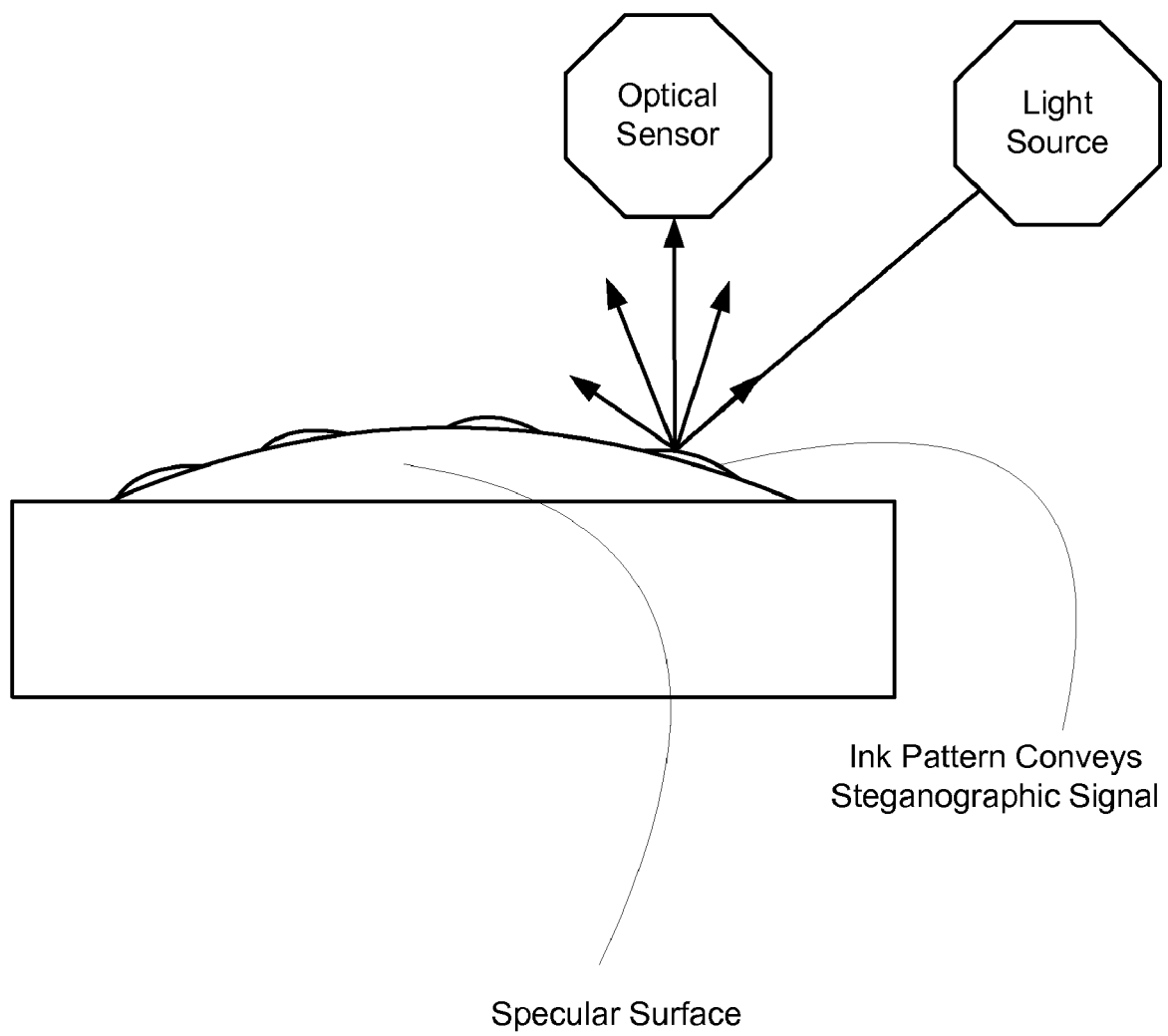
FIG. 4b illustrates a reflectance example including an optical sensor remotely located with respect to a light source.

It should be realized that the reflectance characteristics shown in FIGS. 2, 4a and 4b are for illustrative purposes only. Of course, a specular surface and applied ink can include additional or different reflectance characteristics. Also, a specular surface is often provided as a thin film or sheet, which can be attached or adhered to a carrier sheet or directly to an object surface. Hence, the FIGS. 2-4 representations of a dome-like surface is only but one of the many possible forms that a specular surface can take.

In an alternative embodiment, a specular surface includes a generally transparent over-laminate (e.g., polycarbonate, polyurethane, and/or polyester, etc.). The over-laminate provides protection to a steganographic signal printed or applied to the specular surface.

Also, instead of applying a steganographic signal on the specular surface, we could provide a steganographic signal in or on a surface of an over-laminate, yet this requires an additional layer.

In still another alternative embodiment, we print a thresholded digital watermark signal or other steganographic signal on an over-laminate or specular surface using invisible (e.g., ultraviolet or infrared) inks.

In yet another embodiment, a thin film of specular material receives the printed steganographic signal on a bottom or underside surface. The film is sufficiently transparent so that the printed ink is viewable through the top surface of the film.

We note that some specular surface may be semi-specular. That is, they reflect some light specularly and some light diffusely. Our inventive techniques work well with such specular surfaces.

While specific dimension of sprinkled ink droplets are provided by way of example in our parent application, the present invention is not so limited. Indeed, ink or dye can be arranged or printed onto a specular surface using conventional printers and printing techniques. And droplet size can be larger or smaller than given in the example.

The implementation of some of the functionality described above (including watermark or steganographic encoding and decoding) can be implemented by suitable software, stored in memory for execution on an associated processor or processing circuitry. In other implementations, the functionality can be achieved by dedicated hardware, or by a combination of hardware and software. Reprogrammable logic, including FPGAs, can advantageously be employed in certain implementations.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A mechanical part comprising:
   a metallic surface including a pattern,
   the pattern conveying plural-bit auxiliary data in a steganographic manner, and
   the pattern provides at least diffuse reflection.

2. The mechanical part of claim 1, wherein the pattern is provided on the metallic surface with an ink or dye.

3. The mechanical part of claim 2 wherein the metallic surface comprises a first color and the ink or dye comprises a second color, the second color being chosen to help hide or conceal the ink or dye when provided over the first color.

4. The mechanical part of claim 1 wherein the pattern conveying the auxiliary data is provided with digital watermarking.

5. The mechanical part of claim 4, wherein the auxiliary data is redundantly provided on the metallic surface.

6. The mechanical part of claim 4, wherein the digital watermarking comprises a component to help resolve distortion introduced during image capture.

7. The mechanical part of claim 1, wherein the pattern is provided in the metallic surface with small indentations in the surface.

8. The mechanical part of claim 1 in which the pattern comprises a dull finish.

9. An automotive part comprising the mechanical part of claim 1.

10. The mechanical part of claim 1, wherein the diffuse reflection approximates Lambertian reflection.

11. A method comprising:
   obtaining plural-bit auxiliary data;
   creating an original carrier signal representing the plural-bit auxiliary data;
   reducing information content of the original carrier signal so that the carrier still conveys the plural-bit auxiliary data, yielding a reduced carrier signal;
   hiding the reduced carrier signal in host data.

12. The method of claim 11 wherein the act of hiding is accomplished with digital watermarking.

13. The method of claim 11 wherein the host data resides on a mechanical part.

14. The method of claim 11 wherein the host data comprises audio or video.

15. A computer readable medium comprising instructions stored thereon to cause an electronic processor to perform the method of claim 11.

16. A programmed computing device comprising instructions stored in memory, said instructions cause said programmed computing device to perform the method of claim 11.

17. A mechanical part comprising:
   a shiny or metallic surface including a pattern,
   the pattern including or representing the auxiliary data in a steganographic manner, the pattern providing diffuse or Lambertian reflection.

18. The mechanical part of claim 17 wherein the pattern is provided with an ink or dye and wherein at least one of a coloration or finish of the ink or dye is selected to hide the ink or dye with respect to at least one of a first coloration or a first finish.

19. The mechanical part of claim 17, wherein the pattern is provided in the shiny or metallic surface through small indentations in the surface.

20. An apparatus comprising:
   electronic memory for storing plural-bit auxiliary data;
   one or more electronic processors programmed for:
      creating an original carrier signal representing the plural-bit auxiliary data;
      reducing information content of the original carrier signal so that the carrier still conveys the plural-bit auxiliary data, yielding a reduced carrier signal;
      hiding the reduced carrier signal in host data.

21. The apparatus of claim 20 in which the hiding is accomplished with digital watermarking.

22. The apparatus of claim 21 in which the one or more electronic processors are operating to perform at least one of the functions recited therein.

23. The apparatus of claim 20 in which the host data is to reside on a mechanical part.

24. The apparatus of claim 20 in which the host data comprises audio or video.

25. The apparatus of claim 24 in which the one or more electronic processors are operating to perform at least one of the functions recited therein.

26. The apparatus of claim 20 in which the one or more electronic processors are operating to perform at least one of the functions recited therein.

* * * * *